(12) United States Patent
Bay

(10) Patent No.: US 7,090,353 B1
(45) Date of Patent: Aug. 15, 2006

(54) SYSTEM AND METHOD FOR IMPROVED DIGITAL PROJECTION

(75) Inventor: Fred M. Bay, Sunnyvale, CA (US)

(73) Assignee: Lockheed Martin Corp., Bethesda, MD (US)

( * ) Notice: Subject to any disclaimer, the term of this patent is extended or adjusted under 35 U.S.C. 154(b) by 159 days.

(21) Appl. No.: 10/917,993

(22) Filed: Aug. 14, 2004

(51) Int. Cl.
*G03B 21/28* (2006.01)

(52) U.S. Cl. .......................... 353/31; 353/99; 348/771

(58) Field of Classification Search .............. 353/31, 353/34, 37, 98, 99, 122; 359/291, 292, 298, 359/633, 634
See application file for complete search history.

(56) References Cited

U.S. PATENT DOCUMENTS

| | | | |
|---|---|---|---|
| 5,192,946 A | 3/1993 | Thompson et al. | 348/764 |
| 5,600,486 A | 2/1997 | Gal et al. | 359/569 |
| 6,128,125 A | 10/2000 | Gericke et al. | 395/298 |
| 6,406,148 B1* | 6/2002 | Marshall et al. | 353/31 |
| 6,863,401 B1* | 3/2005 | Penn | 353/31 |
| 6,882,374 B1* | 4/2005 | Numakoshi | 348/769 |
| 2005/0190140 A1* | 9/2005 | Asahi et al. | 345/100 |

OTHER PUBLICATIONS

WO9533343A1, "High Resolution Subtractive Color Project System".

* cited by examiner

*Primary Examiner*—William C. Dowling
(74) *Attorney, Agent, or Firm*—Kenneth W. Float

(57) ABSTRACT

Improved digital projection systems and methods are disclosed. Exemplary systems and methods embody a digital data source and a white light source. Light output of the white light source is coupled to a two-position digital micro-mirror device that separates black and colored pixels. The reflected color pixels output of the two-position digital micro-mirror device are coupled to a diffraction micro-lens array that diffracts the colored pixels to produce partial spectrum color bands. The diffracted partial spectrum color bands output of the diffraction micro-lens array is coupled to a three-position digital micro-mirror device that produces hue of each pixel. Micro-mirrors of the two- and three-position digital micro-mirror devices are controlled by the digital output of the digital data source. The output of the three-position digital micro-mirror device is coupled to projection optics that combines the partial spectrum color bands and projects an image.

14 Claims, 2 Drawing Sheets

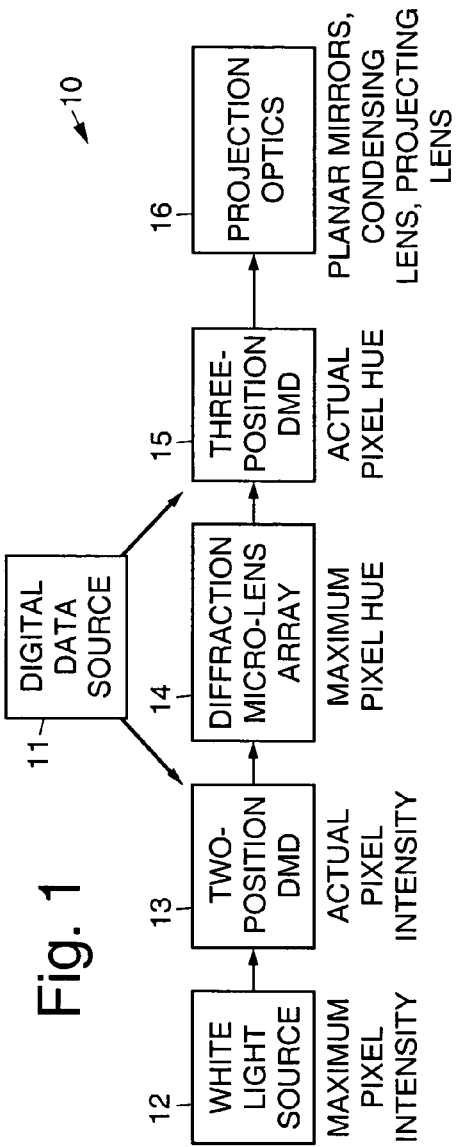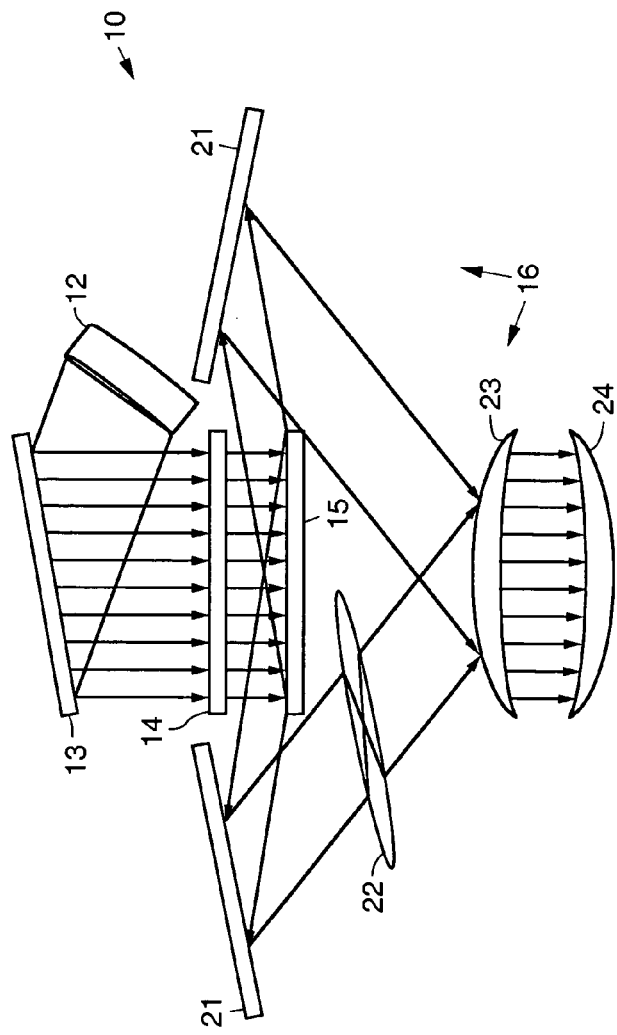

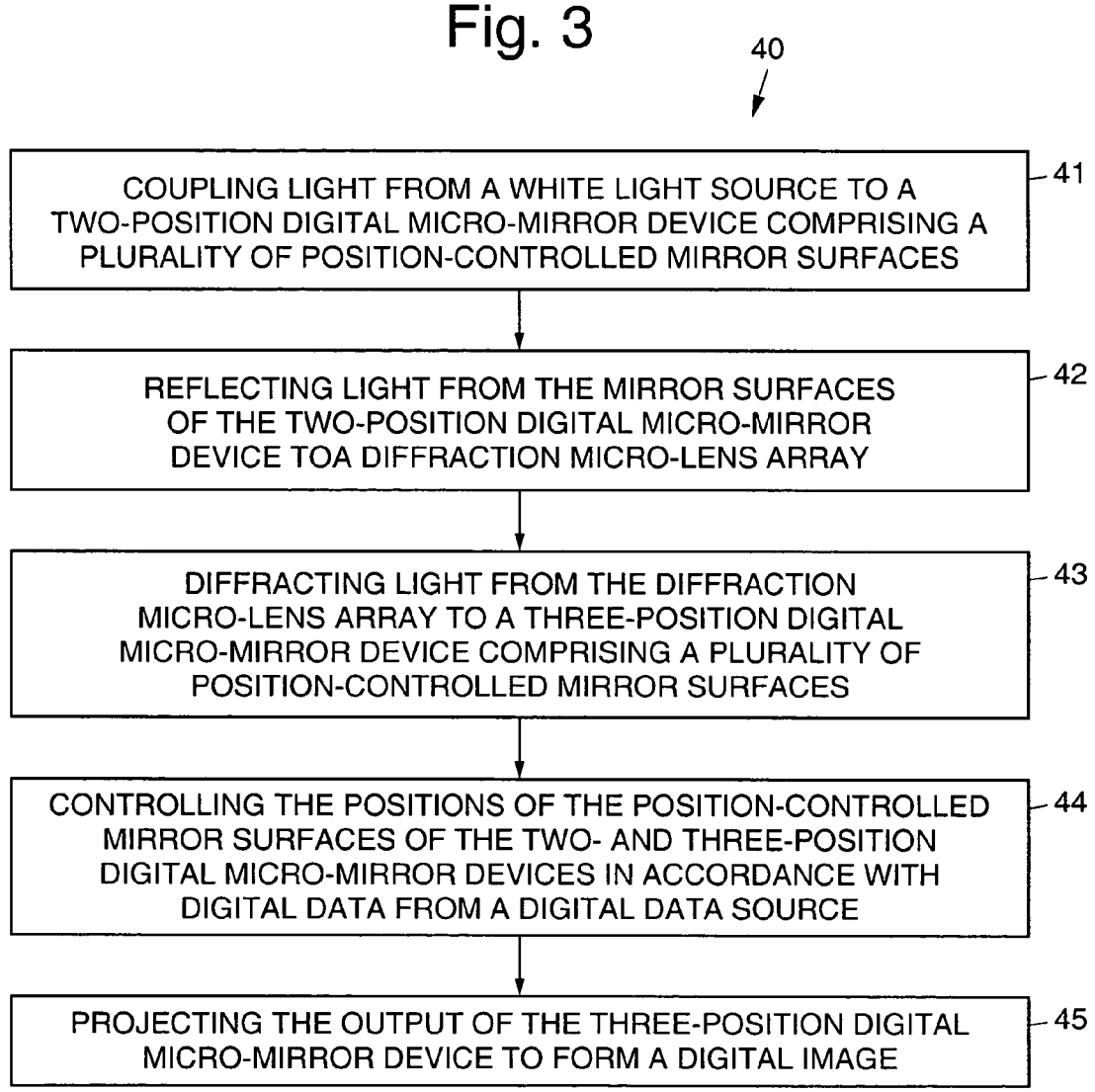

SYSTEM AND METHOD FOR IMPROVED DIGITAL PROJECTION

BACKGROUND

The present invention relates to digital projection systems and methods.

The current state-of-the-art relating to digital projection systems employs digital micro-mirror device (DMD) technology, white light illumination, and sequenced primary color filtering. The DMD technology is an implementation of micro-electromechanical systems (MEMS) technology on silicon. The DMD is comprised of an array of hinged mirrors independently actuated into a deformed state by the application of voltage across a circuit that includes the mirror. The deformed mirror reflects the filtered white light to a projecting lens assembly. Each mirror of the array represents a single pixel of the projected image and is actuated in synchronization with the primary color of the pixel in the current frame. Color blending is achieved by actuating the mirror to the on position in more than one color more frequently than the human eye detection rate. This implies that the light filtering is also more rapid than the minimum micro-mirror actuation rate. The light filtering sequence is accomplished by a rotating wheel of segmented filters between the white light source and the mirrors. The synchronization of the spinning wheel and the micro-mirror actuations are a critical parameter in the creation of the intended image.

Another method for digital projection uses three micro-mirror arrays and a set of dichroic mirrors to separate the illumination source into three spectral colors, red, green, and blue, focused on each of the micro-mirror arrays. The three micro-mirror arrays must be synchronized to blend the primary colors appropriately for each pixel. The series of dichroic mirrors are also less efficient at separating the white light from the illumination source into the primary colors than a single diffracting lens. This approach benefits over the previously-discussed solution by improving the intensity of projected lighting by continuously projecting each pixel, except to achieve black pixels. The three micro-mirror arrays are channeled to a common refocusing lens for the projection. The light path for each lens is matched in length to retain the pixel synchronization.

The use of a binary modulation scheme to actuate the mirror limits each pixel to two operational states, on and off, and requires the projected image to discretely sequence through the three filtered colors to achieve a perceived smooth color projected image. The cycling of the image through the color spectrum dilutes the original white light illumination significantly, up to 67% per pixel. The physical filtering also reduces the illumination.

The three micro-mirror approach is solid state and offers advantages that are similar to that of the present invention from that perspective. However, the inherent tolerances for optics alignment and synchronization make it amenable only for fixed installation projection systems and not feasible for portable projection systems. The series of dichroic filters is a less efficient use of the illumination source than the present invention.

U.S. Pat. No. 6,128,125 issued Oct. 3, 2000 to Gericke, et al. discloses that a "digital projector comprises an array of light modulators displaying the image information. An optical system is arranged downstream of the light modulators and is made up of mirrors and/or prisms, with the mirrors and/or prisms being arranged such that the light beams coming from the individual light modulators are combined in front of a projection lens. For simplification of the optical system the light modulators are arranged in checkerboard formation." [see Abstract]

WIPO publication number WO9533343A1 entitled "High Resolution Subtractive Color Projection System" discloses a "color projector for forming a high resolution image through a plurality of stacked display panels. The projector employs subtractive color technology to project a real or virtual color image. In order to provide a highly focused image free from parallax effects, a dichroic mirror assembly is provided to reflect the light exiting the display panels and compensate for differences in optical path lengths between display panels while maintaining high resolution focusing capability. Light output averaging means are provided to eliminate additional parallax effects. High resolution optics are provided between the dichroic mirror assembly and the projection screen in order to provide focus for the image." [see Abstract]

SUMMARY OF THE INVENTION

The present invention provides for digital projection systems and methods that improve upon the prior art concepts discussed above. Exemplary systems and methods comprise a digital data source and a white light source. Light output of the white light source is coupled to a two-position digital micro-mirror device that separates black and colored pixels. The reflected color pixels output of the two-position digital micro-mirror device are coupled to a diffraction micro-lens array that diffracts the colored pixels to produce partial spectrum color bands. The diffracted partial spectrum color bands output of the diffraction micro-lens array is coupled to a three-position digital micro-mirror device that produces hue of each pixel. Micro-mirrors of the two- and three-position digital micro-mirror devices are controlled by the digital output of the digital data source. The output of the three-position digital micro-mirror device is coupled to projection optics that combines the partial spectrum color bands and projects an image.

BRIEF DESCRIPTION OF THE DRAWINGS

The various features and advantages of the present invention may be more readily understood with reference to the following detailed description taken in conjunction with the accompanying drawing figures, described by way of example, wherein like reference numerals designate like structural elements, and in which:

FIG. 1 is a block diagram that illustrates an exemplary digital projection system in accordance with the principles of the present invention;

FIG. 2 shows a two-dimensional schematic illustrating optics of the exemplary digital projection system; and FIG. 3 is a flow diagram that illustrates an exemplary method in accordance with the principles of the present invention.

DETAILED DESCRIPTION

Referring to the drawing figures, FIG. 1 is a block diagram that illustrates an exemplary digital projection system 10 in accordance with the principles of the present invention. The present invention provides for an improvement in digital projection for use in direct projection systems such as theaters, home entertainment centers, and portable business equipment and in rear projection systems such as large screen television and desk top computer displays.

There are growing needs and markets for high intensity projection systems to take images stored digitally and project them. The present invention provides for such a system 10.

The present invention combines digital data and micro-optic technologies, which produce a dynamic pixel image, typically with over a million pixels represented by the digital data. Systems 10 implemented using the principles of the present invention may be used in cinemas, arenas and other large spaces. Additionally, this technique may be made small enough to be hand-carried. The present invention is likely to enhance the use of digital images and to provide higher quality images than existing technologies.

The present invention combines digital data and micro-optic technologies to produce a dynamic pixel image direct projection system 10. The digital data may be supplied by any well-known and documented digital data source 11, such as a personal computer, digital video disk (DVD), or high definition television (HDTV).

Micro-optics 13, 15 employed in the system 10 are based on well-known and documented technologies comprising digital micro-mirror devices (DMD) 13, 15, such as those manufactured by Texas Instruments, for example, and diffracting micro-lenses 14, such as those manufactured by Lockheed Martin Corporation, for example. More particularly, the digital micro-mirror devices 13. 15 may be similar to those disclosed in U.S. Pat. No. 5,192,946, for example. The diffracting micro-lenses 14 may be similar to those disclosed in U.S. Pat. No. 5,600,486, for example. The contents of U.S. Pat. Nos. 5,192,946 and 5,600,486 are incorporated herein by reference in their entirety.

As is shown in FIG. 1, the dynamic image derived from the digital data source 11 is encoded into pixel-by-pixel intensity and hue for interpretation by a two-position and a three-position DMD 13, 15. A white light source 12 uniformly distributes white light over the two-position DMD 13 and establishes the maximum intensity of each pixel. Modulation of individual micro-mirrors of the two-position DMD 13 allows for variation in intensity between zero and one hundred percent in increments determined by the structure of the digital data from the digital data source 11.

For instance, an eight-bit digital data structure provides for 256 increments of intensity. Black pixels in the image are zero percent reflected to the remaining elements of the projection system 10. White light from the white light source 12 is reflected by the two-position DMD 13 onto a diffracting micro-lens array 14. The diffracting micro-lens array 14 comprises a color separation grating integrated with a refractive lens, as is disclosed in U.S. Pat. No. 5,600,486, for example. The reflected white light it is decomposed by the diffracting micro-lens array 14 into a partial spectrum by the integral diffraction grating and focused on the corresponding micro-mirror of the three-position DMD 15. The partial spectrum is discrete red, green, and blue projections.

By generating and focusing the partial spectrum on each micro-mirror of the three-position DMD 15, the micro-lens array reduces the alignment sensitivity of the projection system 10. Modulation of individual micro-mirrors of the three-position DMD 15 allows variation in hue of each pixel. The combination of available red, green, and blue spectral light can be varied to produce one color, equal parts of each, or white light. The levels of variation are dependent upon the digital data structure. For instance, an eight-bit data structure provides for 256 combinations of the three colors, or 85 increments of hue. Similarly, a three eight-bit data structure provides for 256 variations of each color, or 16,777,216 increments of hue.

Projection optics 16 (shown in more detail in FIG. 2) includes three planar mirrors 21 (two of which are shown in FIG. 2) that reflect the individual spectral light from each of the positions of the three-position DMD 15 to a single, common condensing lens 23 which in-turn directs the combined image to a projecting (objective) lens 24. An image reversing lens 22 is disposed between one of the planar mirrors 21 (that is used to reflect the diffracted light) and the common condensing lens 23. Each pixel of the resulting image is the result of the interaction of light from a corresponding micro-mirror from each of the DMDs 13, 15 and a micro-lens from the micro-lens array 14.

A two-dimensional schematic of the optics used in the digital projection system 10 is shown in FIG. 2. The third dimension is similar to those shown, but is perpendicular to the page of the drawing figure. The necessary reflective angle of the green spectral light from the neutral position of the three-position DMD 15 requires a focal length gradient across the micro-lens array 14.

The tertiary modulation scheme of the three-position DMD 15 provides a mechanism for continuous projection of each non-black pixel. The spectral light is continuously illuminated onto each mirror as discrete bands, with green in the center and red and blue on either side. The three states of the micro-mirror are left tilt, neutral, and right tilt. Each micro-mirror is activated at a frequency sufficiently higher than the flicker frequency of the human eye to blend the spectral colors into a desired projected color.

Tertiary modulation of the DMDs 13, 15 requires some changes in supporting circuitry and the projecting lens assembly of existing technology. Each micro-mirror of the DMDs 13, 15 reacts to voltage differentials from either of two underlying circuits to control the deformation direction of the micro-mirror. Since the micro-mirror deflects in either of two directions, the reflected light is directed in separate directions and since the neutral position is also an active reflecting state, three planar mirrors 21 (two of which are shown in FIG. 2) are required to direct the spectral light to the single condensing lens 23 and projecting lens 24. The multiple reflection paths that separately redirect the spectral light to a common projection path must be of equal length to properly recombine the spectral light.

The spectral diffraction of light onto each mirror in the micro-lens array 14 is accomplished by placing the array of micro-lenses with integral diffraction grating between the illumination source 12 and the three-position micro-mirror array 15. Light from the common illumination source 12 is converted into discrete illumination points focused on the array of mirrors. The integral diffraction grating separates the focused illumination points into the partial spectrum color bands, red, green, and blue.

The processes that the light goes through to become a colored pixel are as follows. Rejection of black pixels is achieved by a two-dimensional array of movable micro-mirrors (the two-position DMD 13). For each non-black pixel, a white light spectrum is established on a planar mirror 21 through the use of micro-lenses and diffraction gratings (the diffracting micro-lens array 14). The digital data is used to control reflection of the correct proportions of red, green and blue onto the condensing lens 23, and the duration of the exposure of the mirror is related to the color of the pixel.

Hue, saturation and intensity represents each separate pixel. Because a white light spectrum is produced by the system 10 for each pixel, it must also be modified by the optics to provide shading, and so forth. This is done by the three-position micro-mirror device (three-position DMD 15).

A unique feature of the present invention is the use of the diffracting micro-lens array 14 and its miniaturized diffraction gratings, etched onto micro-lenses, to obtain the optical spectra relevant to each pixel. Conventional implementations use internal reflecting and diffracting prisms which are less efficient. Another unique feature of the present invention is the combined use of the diffracting micro-lens array 14 and the micro-mirror arrays 13, 15.

Integral to the design of the system 10 is the use of two micro-mirror arrays 13, 15 and a set of miniaturized combination diffraction grating and focusing lenses (the diffracting micro-lens array 14). The first micro-mirror array 13 (which separates black and colored pixels) has two physical positions for each pixel. The second micro-mirror array 15 has three positions for each pixel and is used to produce the hue of each pixel of the primary colors, red, green and blue. Others, using conventional technologies, use internal diffraction and reflection prisms to obtain the spectra.

In both arrays 13, 15, each of the micro-mirrors tilts along a diagonal; the same diagonal for all micro-mirror elements. Each micro-mirror reacts to voltage differentials from underlying circuits, which control the tilt of the mirror with respect to the incoming light. The dual-position mirror activation circuitry is substantially similar to traditional activation circuitry and is activated only when the underlying circuitry finds a value of 000 for red, green and blue in a single pixel. The three-position DMD 15 activation circuitry has two versions of traditional activation circuitry, one for each possible deflection from neutral.

The circuitry of the two-position micro-mirror array 13 permits the mirrors to reflect white light onto the next component of the optical system. The light is reflected away from the projection system to vary the pixel intensity, including producing black pixels. Energizing the underlying circuit draws down the affected corner to the underlying substrate to close the circuit and tilt the micro-mirror.

Presented below is a description of the operation of the micro-mirrors and micro-lenses, the data path, the optical path, and the advantages of the present system.

The Optical Path

Digital micro-mirror devices have been in existence and use since 1987 and are well-described in the literature. Typical versions of the current generation of these devices include matrices of more than 1000 by 1000 identical micro-mirrors each capable of assuming two positions. Each micro-mirror is square. Microchip manufacturing techniques are used to make these devices as is well-known in the art.

If one has data representing a black and white image (e.g. a monochromatic line drawing) one could project this simply by projecting the non-black pixels. The position of each micro-mirror is determined by the data presented to its underlying circuit. Consequently, when there is no current the micro-mirror is in its original position and reflects the incident white light into the diffracting micro-lens array 14.

Each of the micro-mirrors is supported by a central post and the entire array is positioned at a 10 degree inclination relative to orthogonal (horizontal). If a charge is delivered to the substrate below, the mirror revolves slightly providing a change in tilt of the mirror (say from +10° to −10° from neutral) and a resulting change in the angles of incidence and reflection of the light. This change of tilt and angle of reflection appears to have occurred about the diagonal of the mirror. In a monochromatic environment, shading (or gray tones) is accomplished by varying the amount of time when the micro-mirrors are in the non-reflecting position and thus the intensity of the image. Non-reflecting for a long time provides dark shading, non-reflecting for a shorter period lightens the shading. The hue of the pixel is determined later by the values of red, green, and blue presented to the second set of micro-mirrors of the three-position DMD 15.

Introducing the color that was coded for each pixel is accomplished with a diffraction system comprising the diffracting micro-lens array 14 which includes an array of focusing micro lenses each ruled with a diffraction grating. This novel combination allows several things to happen. Each micro-lens is presented with the white light, so for each pixel the diffraction gratings produce a partial spectrum (blue, green, and red) of the white light on the appropriate micro mirror of the three-position micro-mirror array 15. The lens part of the combination is used to focus the resulting partial spectrum onto each micro-mirror. The second micro-mirror array 15 reflects the colored image to the condensing lens 23 using three planar mirrors 21, one for each position of the three-position micro-mirrors, to gather the dispersed and diffracted light and to re-combine it onto the projecting (objective) lens 24 for eventual projection.

The hue of each projected pixel is the product of the mix of the blue, green, and red light collected at the condensing lens 23. The pixel-by-pixel mix of colors are provided as data to each of the three-position micro-mirrors. To reproduce the correct hue, each pixel must be broken down into these three components and re-combined on a display screen.

In some conventional systems, refraction and reflection in a series of glass prisms before the objective plane perform this light dispersion. The projection image might be subject to as many as five reflections losing intensity on each occasion.

The Data Path

The digital data presented simultaneously to the two micro-mirror arrays 13, 15 includes matrix position information and the intensities of red green and blue for that pixel. The entire matrix is refreshed at least 24 times per second. This is the minimum rate for the human eye to persuade itself that it is seeing a continuous and changing image and the higher rate of 30 Hertz is preferable. In some applications (such as computer monitors) refresh rates of hundreds of Hertz are desirable.

The Light Path

Each of the micro-mirrors include a corresponding matrix of mirrors. White light from the common source 12 is focused on each micro-mirror of the two-position micro-mirror array 13 which represent an image pixel. The first micro-mirror distinguishes between black and colored pixels and rejects the black pixels from projection. This is done by having one of the two angles for black pixels and using the second angle to reflect the light (again, pixel-by-pixel) onto a micro-lens diffractor of the diffracting micro-lens array 14. This micro-lens diffractor separates the light into its visible spectrum and focuses the spectrum onto the three-position micro-mirror array 15.

Each of the primary colors (red, green and blue) is reflected by the three position micro-mirror array 15 to one of three planar mirrors 21. The micro-mirrors of the three position micro-mirror array 15 constantly cycle through their three positions so that each part of the spectrum is reflected to the appropriate mirror resulting in monochromic images of the original image on each of the three planar mirrors 21.

The three planar mirrors 21 reflect onto the single condensing (concentrating) lens 23, which re-combines the primary colors to re-produce the original hue and project it onto the ultimate display surface. The design of an equal length projection path for each of the three primary colors is achieved through the use of measured routing paths to the common condensing lens 23.

The present invention allows for the simultaneous projection of all pixels, the separation of intensity and hue into distinct pixel variables, a tolerant light path alignment between micro-mirror arrays 13, 15, and a more efficient use of the white light projection source 12 to provide improved projected image clarity and/or reduced power consumption and heat generation.

With the above in mind, and for the purposes of completeness, referring to FIG. 3, it is a flow diagram that illustrates an exemplary method 40 in accordance with the principles of the present invention. The exemplary method 40 comprises the following steps.

White light is coupled 41 from a white light source to a two-position digital micro-mirror device comprising a plurality of position-controlled mirror surfaces. Light is reflected 42 from the mirror surfaces of the two-position digital micro-mirror device to a diffraction micro-lens array. Light is diffracted 43 from the diffraction micro-lens array to a three-position digital micro-mirror device comprising a plurality of position-controlled mirror surfaces. Positions of the position-controlled mirror surfaces of the two- and three-position digital micro-mirror devices are controlled 44 in accordance with digital data from a digital data source. The output of the three-position digital micro-mirror device is projected 45 to form an image.

The present invention improves the efficiency of use of the illumination by eliminating the color sequencing of the lower performance version of conventional systems. Novel features of the present invention include advancement of digital micro-mirror technology to a tertiary state device, use of micro-lens technology to generate efficient primary color sources, and use of serial digital micro-mirror devices.

Advantages of the present invention are that there is a reduced parts count and simplified electronics synchronization. Operational advantages of the present invention include the reliability of 100% solid state components more efficient illumination utilization lower illumination source intensity reduced power consumption lower thermal generation.

The present invention reduces the number of synchronized micro-mirror arrays from three to two and increases the synchronization tolerance by simplifying the function of the first array to a longer duty cycle for the most sophisticated of the current systems. The inherent improvement in transmitted light intensity of the diffracting micro-lens array over the series of dichroic mirrors is a further improvement eliminating the normal restriction of fixed theater installations and allowing use in smaller settings such as home entertainment centers and portable projection systems Thus, improved digital projection systems and methods have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital image projection system comprising:
    a white light source for outputting white light;
    a digital data source for outputting digital data;
    a two-position digital micro-mirror device comprising a plurality of position-controlled mirror surfaces whose respective positions are controlled by the digital data, and that reflects the white light in accordance with the digital data to separate black and colored pixels;
    a diffraction micro-lens array for diffracting the colored pixels to produce partial spectrum color bands;
    a three-position digital micro-mirror device comprising a plurality of position-controlled mirror surfaces whose respective positions are controlled by the digital data, and that reflects the partial spectrum color bands in accordance with the digital data to produce a hue of each pixel; and
    projecting optics for combining the reflected partial spectrum color bands produced by the three-position digital micro-mirror device and projecting it to form an image.

2. The system recited in claim 1 wherein the projecting optics comprises:
    three planar mirrors that reflect individual spectral bands derived from the three-position digital micro-mirror device;
    a common condensing lens for combining light from each of the three planar mirrors; and
    a projecting lens for projecting light combined by the condensing lens.

3. The system recited in claim 1 wherein the diffraction micro-lens array comprises a color separation grating integrated with a refractive lens.

4. The system recited in claim 1 wherein the white light source uniformly distributes white light over the two-position digital micro-mirror device and establishes a maximum intensity of each pixel.

5. The system recited in claim 1 wherein modulation of individual micro-mirrors of the two-position digital micro-mirror device varies the intensity of the light between zero and one hundred percent in increments determined by the digital data.

6. The system recited in claim 1 wherein modulation of individual micro-mirrors of the three-position digital micro-mirror device varies the hue of each pixel.

7. The system recited in claim 1 wherein the partial spectrum color bands comprise red, green, and blue.

8. A digital image projection method, comprising the steps of:
    coupling light from a white light source to a two-position digital micro-mirror device comprising a plurality of position-controlled mirror surfaces;
    controlling positions of the mirror surfaces of the two-position digital micro-mirror device in accordance with digital data from a digital data source to separate black and colored pixels;
    diffracting the colored pixels using a diffraction micro-lens array to produce partial spectrum color bands;
    coupling the partial spectrum color bands to a three-position digital micro-mirror device comprising a plurality of position-controlled mirror surfaces;
    controlling the positions of the position-controlled mirror surfaces of the three-position digital micro-mirror device in accordance with the digital data to produce a hue of each pixel; and
    projecting the output of the three-position digital micro-mirror device to form an image.

9. The method recited in claim 8 wherein the projecting step comprises the steps of:
    reflecting individual spectral bands derived from the three-position digital micro-mirror device;

combining light from each of the three planar mirrors using a common condensing lens for; and projecting light combined by the condensing lens.

10. The method recited in claim 8 wherein the diffraction micro-lens array comprises a color separation grating integrated with a refractive lens.

11. The method recited in claim 8 wherein the step of coupling light from the white light source comprises uniformly distributing white light over the two-position digital micro-mirror device to establish a maximum intensity of each pixel.

12. The method recited in claim 8 wherein the step of controlling positions of the mirror surfaces of the two-position digital micro-mirror device comprises modulating individual micro-mirrors of the two-position digital micro-mirror device to vary the intensity of the light between zero and one hundred percent in increments determined by the digital data.

13. The method recited in claim 8 wherein the step of controlling the positions of the position-controlled mirror surfaces of the three-position digital micro-mirror device comprises modulating individual micro-mirrors of the three-position digital micro-mirror device to vary the hue of each pixel.

14. The method recited in claim 8 wherein the partial spectrum color bands comprise red, green, and blue color bands.

\* \* \* \* \*